United States Patent [19]

Steinsträsser

[11] 4,012,434
[45] Mar. 15, 1977

[54] NEMATIC COMPOUNDS AND MIXTURES

[75] Inventor: Ralf Steinsträsser, Darmstadt, Germany

[73] Assignee: Merck Patent Gesellschaft mit beschrankter Haftung, Darmstadt, Germany

[22] Filed: Oct. 24, 1975

[21] Appl. No.: 625,550

Related U.S. Application Data

[62] Division of Ser. No. 277,502, Aug. 3, 1972.

[30] Foreign Application Priority Data

Aug. 7, 1971 Germany .......................... 2139628

[52] U.S. Cl. .......................................... 260/473 R
[51] Int. Cl.[2] ........................................ C07C 69/76
[58] Field of Search ............................ 260/473 R

[56] References Cited
UNITED STATES PATENTS 1,974,689  9/1934  Pfaff et al. ...................... 260/473 R

*Primary Examiner*—Paul J. Killos
*Attorney, Agent, or Firm*—Millen & White

[57] ABSTRACT

Compounds of the general formula

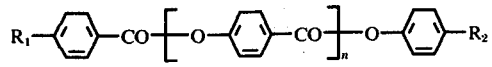

wherein $n$ is 0, 1 or 2, $R_1$ is straight-chain alkyl or alkoxy of 1–7 carbon atoms or straight-chain alkanoyloxy of 2–7 carbon atoms, and $R_2$ is straight-chain alkyl or alkoxy of 1–7 carbon atoms with the proviso that when $n$ is 0, $R_1$ and $R_2$ together contain at least 4 carbon atoms, which form nematic phases, can be produced by reacting a phenol of the general formula

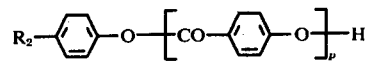

wherein $R_2$ has the values given above, and $p$ is 0, 1 or 2 or a corresponding phenolate, with an aromatic carboxylic acid of the general formula

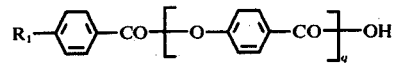

wherein $R_1$ has the values given above, and $q$ is 0, 1 or 2, and the sum $p + q$ is $n$, or with a reactive derivative of this acid.

12 Claims, No Drawings

NEMATIC COMPOUNDS AND MIXTURES

This is a division of application Ser. No. 277,502, filed Aug, 3,1972.

BACKGROUND OF THE INVENTION

This invention relates to nematic and nematogenic compounds and to nematic mixtures of these compounds with each other or with other conventional nematic or nematogenic compounds or both.

For uses of nematic compounds and compositions see, e.g., App. Physics Letters 13, 46 (1968); Scientific American 222, 100 (1970) (dynamic scattering in electronic devices, construction and manufacture of such devices); furthermore: Zeitschrift für Naturforschung 20a, 572 (1965); 23a, 152 (1968); Österr. Chem.-Ztg. 68. 113 (1967) (use of nematic liquid crystals in nuclear resonance spectroscopy).

Nematic substances are compounds capable of forming an enantiotropically nematic phase, i.e., their conversion point from the anisotropic to the isotropic condition (transition point) is above their melting point. Substances which are monotropically nematic, i.e., wherein the conversion point from the anisotropic to the isotropic condition is below the melting point in the metastable range are called nematogenic. Furthermore, substances are nematogenic which form an enantiotropic nematic phase only in a mixture with other nematogenic or nematic compounds.

In the development of electronic components, particularly electronic indicating devices, characterized inter alia, by a flat structure and richness in image contrast, compared, for example, to conventional counter or cathode-ray tubes, liquid crystals with a nematic phase have served for several years as picture screen material. These compounds display, in their nematic range, i.e., the range between their melting point (m.p.) and their transition point (t.p.), a change in their light-scattering characteristic when can be controlled by electrical constant (d.c.) fields and alternating fields. A prerequisite of this property, called dynamic scattering effect, is that the dipole moment of the molecule forms an angle with the longitudinal axis of the molecule.

In order to exploit this dynamic scattering effect for the production of images, a thin layer of a thickness of a few microns of a suitable nematic compound is placed between two electrode plates, one or also both of which are transparent. If an electrical field is now applied, contrasts are produced by the change in light dispersion which can then be observed by direct frontal view or by rear viewing.

Nematic compounds, the dipole moment of which is disposed in the direction of the longitudinal axis of the molecule do not exhibit the dynamic scattering effect. When introducing such substances into an electric field, the molecules are aligned in parallel relative to the lines of flux. By dissolving foreign substances, e.g., dichroic or photochromic dyes, in such nematic liquids, the molecules of such dyes are aligned together along with the nematic carrier liquid by applying an electric field thereto. However, in the aligned condition, these dyes absorb less light than in the random condition. By the application of an electric field, a lightening of the color is effected between two transparent electrodes which, with a suitable choice of the dyes and their concentration, can go so far as to make the dielectric appear colorless. With nematic substances having a dipole moment in the direction of the longitudinal axis of the molecule in combination with appropriate dyes, e.g., methyl red or indophenol blue, it is thus possible to produce dielectrics which, upon being introduced between two conductive glasses, e.g., glass plates or panes, electrically controllable, wavelength-selective optical filters or shutters. Such devices are useful, for example, for cameras, laser outputs and automotive vehicle windows. A combination of three such devices which are transmissive, without an electric field, respectively for only one of the primary colors, viz., red, yellow or blue, and which can be electrically controlled individually, can be utilized for the reproduction of colored images or other information.

For the use of these effects in practice, nematic substances are required which are in the nematically liquid-crystalline condition at room temperature, since otherwise the indicating device must be thermostated, i.e., heated, which is expensive from a technical viewpoint. Nematic substances of this type are known, e.g., compounds of the asymmetrically p,p'-disubstituted benzylidene anilines and the asymmetrically p,p'-disubstituted azoxybenzenes classes.

A further requirement which must be met by practically usable nematic substances is a satisfactory chemical stability with respect to oxygen and moisture, particularly during the exposure to d.c. and alternating electrical fields. This condition is not met by the nematic compounds from the group of the benzylidene anilines. Such compounds are stable for only a few hours in a d.c. electrical field. In the form of Schiff bases, they are additionally split due to hydrolysis relatively readily by traces of moisture.

Nematic substances based on azoxybenzenes, although fulfilling the requirements of being chemically stable and exhibiting a low melting point, are limited in their practical usefulness due to their inherent yellow coloring resulting from their particular structure. Such substances are therefore unsuitable for the production of color effects. Also, the utilization of the dynamic scattering effect is not possible to an optimum extent with the azoxybenzene derivatives, because the thus-produced contrasts, due to the absorption of part of the impinging light by the colored nematic liquid, are, of course, weaker than those obtained when using a colorless nematic liquid.

SUMMARY OF THE INVENTION

In its composition aspect, this invention relates to nematic mixtures containing one or more compound of general Formula I

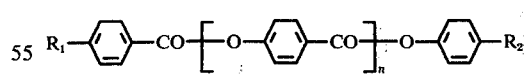

wherein $n$ is 0, 1 or 2, $R_1$ is straight-chain alkyl or straight-chain alkoxy of 1–7 carbon atoms or straight-chain alkanoyloxy of 2–7 carbon atoms, and $R_2$ is straight-chain alkyl or straight-chain alkoxy of 1–7 carbon atoms, with the proviso that when $n$ is 0, $R_1$ and $R_2$ together contain at least 4 carbon atoms.

In a method of use aspect, this invention relates to the use of nematic mixtures of compounds of Formula I with each other or with other conventional nematic or nematogenic substances, which mixtures are excellently suitable for use as picture screen material for electronic indicators or as carrier liquids for electrically controllable optical filters.

In its compound aspect, this invention relates to novel compounds of Formula I. In a process aspect, this invention relates to a process for the production of compounds of Formula I.

DETAILED DISCUSSION

The compounds of this invention, including mixtures thereof, exhibit melting points in the range of from room temperature to greatly lower temperatures, and have in most cases transition-point temperatures which are relatively high. They are colorless liquids in their nematic condition, which liquids are extraordinarily stable with respect to oxygen and mixture, even in d.c. and alternating electric fields.

The compounds of Formula I with two and/or four aromatic rings ($n = 0$ and $n = 2$, respectively) exhibit the dynamic scattering effect and yield optimum contrasts as dielectrics in the above-described indicators. The compounds of Formula I with three aromatic rings ($n = 1$) possess a dipole moment oriented in parallel to the longitudinal axis of the molecule and can thus be employed as nematic carrier liquids for the above-described, electrically controllable color filters.

Preferred monoesters of Formula I are compounds of the general Formula Ia

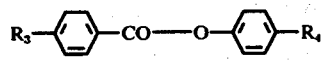

wherein: (a) $R_3$ and $R_4$ are identical or different and are straight-chain alkyl of 2–7 carbon atoms; (b) $R_3$ is straight-chain alkoxy of 1–7 carbon atoms, and $R_4$ is straight-chain alkyl of 2–7 carbon atoms, $R_3$ and $R_4$ together containing at least 4 carbon atoms; (c) $R_3$ is straight-chain alkyl of 2–7 carbon atoms, and $R_4$ is straight-chain alkoxy of 1–7 carbon atoms, $R_3$ and $R_4$ together containing at least 4 carbon atoms; (d) $R_3$ is straight-chain alkanoyloxy of 2–7 carbon atoms, and $R_4$ is straight-chain alkyl of 2–7 carbon atoms; (e) $R_3$ and $R_4$ are identical or different and are straight-chain alkoxy of 1–7 carbon atoms, $R_3$ and $R_4$ together containing at least 4 carbon atoms; and (f) $R_3$ is straight-chain alkanoyloxy of 2–7 carbon atoms, and $R_4$ is straight-chain alkoxy of 1–7 carbon atoms, $R_3$ and $R_4$ together containing at least 4 carbon atoms [$R_3$ and $R_4$ together containing at least 4 carbon atoms.]

Preferred diesters of Formula I are compounds of general Formula Ib

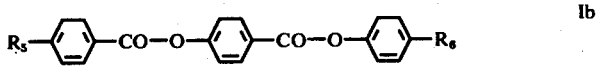

wherein: (g) $R_5$ and $R_6$ are identical or different straight-chain alkyl of 2–7 carbon atoms; (h) $R_5$ is straight-chain alkoxy of 1–7 carbon atoms, and $R_6$ is straight-chain alkyl of 2–7 carbon atoms; (i) $R_5$ is straight-chain alkyl of 2–7 carbon atoms, and $R_6$ is straight-chain alkoxy of 1–7 carbon atoms; and (j) $R_5$ is straight-chain alkanoyloxy of 2–7 carbon atoms, and $R_6$ is straight-chain alkyl of 2–7 carbon atoms.

Preferred triesters of Formula I are compounds of general Formula Ic

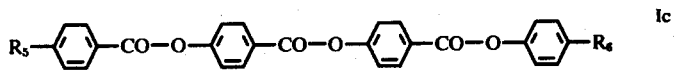

wherein $R_5$ and $R_6$ have the values given for Formula Ib, particularly those wherein $R_5$ is straight-chain alkoxy of 1–7 carbon atoms and $R_6$ is straight-chain alkyl of 2–7 carbon atoms.

Furthermore, this invention relates to processes for the preparation of the compounds of Formula I and nematic mixtures containing at least one compound of Formula I.

The compounds of Formula I of this invention are produced by (i) reacting either a phenol of the general Formula II

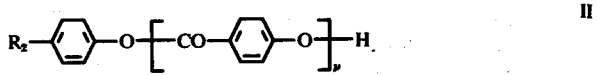

wherein $R_2$ has the values given for Formula I, and $p$ is 0, 1 or 2 or a corresponding phenolate, with an aromatic carboxylic acid of the general Formula III

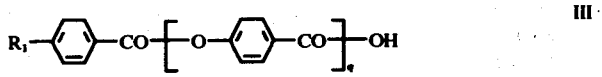

wherein $R_1$ has the values given for compounds of Formula I, $q$ is 0, 1 or 2, and the sum $p + q$ is $n$, or with a reactive derivative of this acid, at a temperature of between −50° C. and +200° C.; or (ii) reacting a phenol of the general Formula IV

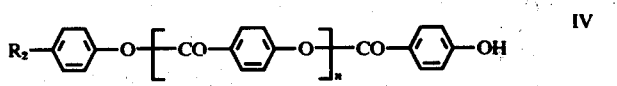

wherein $R_2$ and $n$ have the values given for Formula I, or a corresponding phenolate, with a straight-chain aliphatic monocarboxylic acid of 2–7 carbon atoms, or with a reactive derivative of this acid, at a temperature of between −50° C. and +200° C.

Preferably, the compounds of Formula I are produced by reacting the phenols of Formula IIa, IIb, or IIc

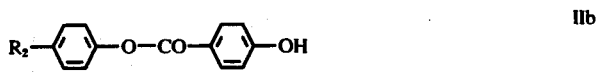

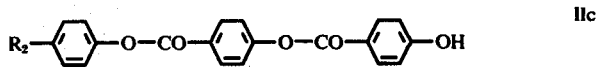

or the alkali metal salts thereof, with a substituted benzoic acid of the Formula IIIa

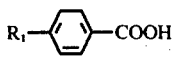

IIIa or with a reactive derivative of this acid.

Some of the phenols of Formulae IIa, IIb, IIc and IV are known. The others can be prepared analogously to the known compounds, e.g., by partial etherification of hydroquinone or by esterification of $R_2$-substituted phenols with 4-hydroxybenzoic acid whose hydroxy group is blocked, for example, by a benzyloxycarbonyl group. Such a blocking group can then be split off, e.g., by catalytic hydrogenation, prior to the further esterification in a conventional manner.

Especially suitable examples of reactive derivatives of the benzoic acids of Formula IIIa, are their halogenides, preferably chlorides or bromides, as well as their anhydrides. These esterification reactions are preferably conducted in a basic medium. Bases which can be employed include alkali metal hydroxides, e.g., sodium or potassium hydroxide, alkali metal carbonates and/or bicarbonates, e.g., sodium carbonate, sodium bicarbonate, potassium carbonate or potassium bicarbonate, alkali metal acetates, e.g., sodium or potassium acetate, alkaline earth metal hydroxides, e.g., calcium hydroxide, and organic bases, e.g., triethylamine, pyridine, lutidine, collidine, and quinoline.

The esterifications are advantageously effected in the presence of an inert solvent. Suitable are ethers, e.g., diethyl ether, di-n-butyl ether, tetrahydrofuran, dioxane and anisole; ketones, e.g., acetone, butanone, pentanone-(3) and cyclohexanone; amides, e.g., dimethylformamide and hexamethylphosphoric triamide; hydrocarbons, e.g., benzene, toluene and xylene; halogenated hydrocarbons, e.g., carbon tetrachloride and tetrachloroethylene; and sulfoxides, e.g., dimethyl sulfoxide and sulfolane. Occasionally, an excess of an organic base employed in the reaction, e.g., pyridine, quinoline, or triethylamine, can also be utilized as the esterification solvent. In principle, the esterification reactions according to this invention can also be effected in the absence of a solvent, e.g., by simply heating the components in the presence of sodium acetate.

The reaction temperature is ordinarily between $-50°$ C. and $+200°$ C., preferably between $-20°$ C. and $+80°$ C. At these temperatures, the esterification reaction normally is terminated after 15 minutes to 48 hours.

When preparing compounds of Formula I by reacting a phenol of general Formula IV or a corresponding phenolate with a straight-chain aliphatic monocarboxylic acid of 2–7 carbon atoms or with a reactive derivative of such an acid, the above-described conditions are likewise ordinarily maintained. In addition to the halogenides and anhydrides, other suitable reactive derivatives of the aliphatic carboxylic acids include the corresponding ketenes.

A preferred embodiment of the process according to this invention resides in first converting a phenol of Formula IIa, IIb, IIc or IV into the potassium salt thereof, e.g., by treatment with ethanolic potassium hydroxide solution; isolating the potassium salt and suspending the latter together with sodium bicarbonate or potassium carbonate in acetone or diethyl ether under agitation; and mixing this suspension dropwise with stirring with a solution of an acid chloride or anhydride in diethyl ether, acetone, or dimethylformamide.

During this process, the reaction mixture is maintained at a temperature of between $-25°$ C. and $+20°$ C., preferably at $-10°$ C. to $-20°$ C. With this mode of operation, the esterification reaction is ordinarily terminated after 15–50 minutes.

The nematic mixtures of this invention contain two, three, four or more components, one or more being a compound of Formula I. The melting point of these mixtures is usually lower than the melting points of the individual components. Normally, this melting point ranges between $-20°$ C. and $+110°$ C., and is preferably below 55° C., particularly below 25° C., in order to make it possible to utilize the mixtures at room temperature. The transition point of these mixtures ranges between about 25° C. and about 210° C., preferably between 50° C. and 150° C. Mixtures having a melting point of below +10° C. and a transition point of between 50° C. and 125° C. are especially preferred. Thus, they display a nematic range of 40° to 115°, with the preferred mixtures having a range of 35° to 110°. However, mixtures having a nematic range of at least 30° C. are likewise usable. Preferably, the composition of the mixtures of this invention corresponds to the quantitative ratio of the components at the eutectic point.

The nematic mixtures of this invention, in addition to the compounds of Formula I, can contain, for example, one or more of the following:

hydrocarbons, especially aryl hydrocarbons, e.g., diphenyl, diphenylmethane, trans-stilbene, diphenylacetylene, and the derivatives thereof substituted in the 4- and/or 4'-position, e.g., 4,4'-dimethoxydiphenyl, 4,4'-dimethoxydiphenylmethane, 4-ethoxy-4'-methoxydiphenylmethane, 4,4'-dimethoxy-trans-stilbene, 4-ethyl-4'-methoxydiphenyl, 4-ethyl-4'-methoxy-trans-stilbene, 4,4'-dimethoxydiphenylacetylene; naphthalene and the 2,6-di-substituted derivatives thereof, e.g., 2-ethoxy-6-propoxynaphthalene; ethers, e.g., diphenyl ether and the derivatives thereof substituted in the 4- and/or 4'-position, e.g., 4,4'-dimethoxydiphenyl ether, 4,4'-diphenoxydiphenyl ether, 4-ethoxy-4'-propionyloxydiphenyl ether, and the corresponding thio ethers; Schiff bases, e.g., benzylidene aniline and the derivatives thereof substituted in the 4- and/or 4'-position, particularly the N-(4-alkoxybenzylidene)-anilines, e.g., N-(4-methoxybenzylidene)-aniline, N-benzylidene-4-alkoxyanilines, e.g., N-benzylidene-4-methoxyaniline, N-(4-alkoxybenzylidene)-4-alkoxyanilines, e.g., N-(4-methoxybenzylidene)-4-methoxyaniline, N-(4-alkoxybenzylidene)-4-acyloxyanilines, e.g., N-(4-methoxybenzylidene)-4-acetoxyaniline, N-(4-alkoxybenzylidene)-4-alkylanilines, e.g., N-(4-methoxybenzylidene)-4-n-butylaniline and N-(4-butoxybenzylidene)-p-toluidine; azo compounds, e.g., azobenzene and the derivatives thereof substituted in the 4- and/or 4'-position, e.g., 4-ethoxy-4'-caproyloxyazobenzene, 4,4'-dimethoxyazobenzene, 4-methoxy-4'-ethoxyazobenzene, 4-n-butyl-4'-methoxyazobenzene, or 4-n-butyl-4'-valeryloxyazobenzene; azoxy compounds, e.g., azoxybenzene and the derivatives thereof substituted in the 4- and/or 4'-position, e.g., 4,4'-dimethoxyazoxybenzene, 4-butoxy-4'-propionyloxyazoxybenzene and 4-n-butyl-4'-methoxyazoxy-benzene; azines, e.g., benzalazine and the derivatives thereof substituted in the 4- and/or 4'-position, e.g., 4,4'-dimethoxybenzalazine; steroids, especially 3-hydroxy steroids, such as cholesterol and stigmasterol, and the esters thereof, e.g., cholesteryl-3-acylates, such as cholesteryl-3-acetate and the homologs thereof, or cholesteryl-3-carbonates, such as cholesteryl-3-methyl carbonate or cholesteryl-3-oleyl carbonate.

Of the compositions of this invention, preferred are mixtures which contain at least two compounds of general Formula I. Particularly preferred are mixtures consisting of two to six, preferably of two to four compounds of general Formula I.

Most preferred are mixtures containing, in addition to the eutectic mixture of the 4'-butylphenyl ester of 4-(4-methoxybenzoyloxy)-benzoic acid and the 4'-butylphenyl ester of 4-(4-butylbenzoyloxy)-benzoic acid and/or the 4'-methoxyphenyl ester of 4-(4-butylbenzoyloxy)-benzoic acid (30–70%), also a eutectic mixture of the 4'-butylphenyl ester of 4-methoxybenzoic acid and the 4'-methoxyphenyl ester of 4-butylbenzoic acid or the 4'-butylphenyl ester of 4-butylbenzoic acid (70–30%), since these mixtures exhibit especially broad nematic phases. These mixtures do not exhibit the dynamic scattering effect and therefore are especially suitable as nematic solvents for dyes. Among the mixtures displaying the dynamic scattering effect, preferred are those which consist of or comprise two or more compounds of the general Formula I. Particularly well suitable as components of such mixtures are the compounds of Formula Ia wherein the residues $R_3$ and $R_4$ have the values given in (d), (e) and (f).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, the temperatures are set forth in degrees Celsius.

EXAMPLE 1

37.6 g. of potassium-4-butylphenolate and 17 g. of sodium bicarbonate are suspended in 400 ml. of anhydrous diethyl ether at −10° and mixed dropwise under agitation with a solution of 34 g. of anisoyl chloride in 100 ml. of diethyl ether. Thereafer, the reaction mixture is agitated for 50 minutes at 20° and filtered. The organic phase is washed with aqueous sodium bicarbonate solution and with water, dried over sodium sulfate, and evaporated. The remaining 4-butylphenyl ester of anisic acid is recrystallized from methanol; m.p. 39°–40°, t.p. 20°.

Analogously, the following compounds are obtained:

4-propylphenyl ester of anisic acid
4-pentylphenyl ester of anistic acid, m.p. 29°, t.p. 42°
4-hexylphenyl ester of anisic acid, m.p. 51°, t.p. 32°
4-heptylphenyl ester of anisic acid, m.p. 34°, t.p. 42°
4-butoxyphenyl ester of anisic acid, m.p. 78°, t.p. 80°
4-hexoxyphenyl ester of anisic acid, m.p. 56°, t.p. 77°
4-heptoxyphenyl ester of anisic acid, m.p. 62°, t.p. 73°
4'-ethylphenyl ester of 4-ethoxybenzoic acid
4'-propylphenyl ester of 4-ethoxybenzoic acid
4'-butylphenyl ester of 4-ethoxybenzoic acid
4'-pentylphenyl ester of 4-ethoxybenzoic acid
4'-hexylphenyl ester of 4-ethoxybenzoic acid
4'-ethoxyphenyl ester of 4-ethoxybenzoic acid
4'-butoxyphenyl ester of 4-ethoxybenzoic acid
4'-hexoxyphenyl ester of 4-ethoxybenzoic acid
4'-ethylphenyl ester of 4-propoxybenzoic acid
4'-propylphenyl ester of 4-propoxybenzoic acid
4'-butylphenyl ester of 4-propoxybenzoic acid
4'-pentylphenyl ester of 4-propoxybenzoic acid
4'-hexylphenyl ester of 4-propoxybenzoic acid
4'-methoxyphenyl ester of 4-propoxybenzoic acid
4'-ethoxyphenyl ester of 4-propoxybenzoic acid
4'-propoxyphenyl ester of 4-propoxybenzoic acid
4'-butoxyphenyl ester of 4-propoxybenzoic acid
4'-pentoxyphenyl ester of 4-propoxybenzoic acid
4'-heptoxyphenyl ester of 4-propoxybenzoic acid
4'-methylphenyl ester of 4-butoxybenzoic acid
4'-ethylphenyl ester of 4-butoxybenzoic acid
4'-propylphenyl ester of 4-butoxybenzoic acid
4'-butylphenyl ester of 4-butoxybenzoic acid, m.p. 69°, t.p. 49.5°
4'-pentylphenyl ester of 4-butoxybenzoic acid, m.p. 68°, t.p. 62°
4'-hexylphenyl ester of 4-butoxybenzoic acid, m.p. 67°, t.p. 55°
4'-heptylphenyl ester of 4-butoxybenzoic acid, m.p. 65°, t.p. 61°
4'-methoxyphenyl ester of 4-butoxybenzoic acid
4'-ethoxyphenyl ester of 4-butoxybenzoic acid
4'-butoxyphenyl ester of 4-butoxybenzoic acid, m.p. 87°, t.p. 92°
4'-pentoxyphenyl ester of 4-butoxybenzoic acid
4'-hexoxyphenyl ester of 4-butoxybenzoic acid, m.p. 64°, t.p. 92°
4'-heptoxyphenyl ester of 4-butoxybenzoic acid, m.p. 65°, t.p. 86°
4'-ethylphenyl ester of 4-pentoxybenzoic acid
4'-butylphenyl ester of 4-pentoxybenzoic acid
4'-pentylphenyl ester of 4-pentoxybenzoic acid
4'-heptylphenyl ester of 4-pentoxybenzoic acid
4'-methoxyphenyl ester of 4-pentoxybenzoic acid
4'-propoxyphenyl ester of 4-pentoxybenzoic acid
4'-butoxyphenyl ester of 4-pentoxybenzoic acid
4'-pentoxyphenyl ester of 4-pentoxybenzoic acid
4'-ethylphenyl ester of 4-hexoxybenzoic acid
4'-propylphenyl ester of 4-hexoxybenzoic acid 4'-butylphenyl ester of 4-hexoxybenzoic acid, m.p. 48°, t.p. 51°
4'-pentylphenyl ester of 4-hexoxybenzoic acid, m.p. 50°, t.p. 62°
4'-hexylphenyl ester of 4-hexoxybenzoic acid, m.p. 44°, t.p. 56.5°
4'-heptylphenyl ester of 4-hexoxybenzoic acid, m.p. 45°, t.p. 63°
4'-methoxyphenyl ester of 4-hexoxybenzoic acid
4'-ethoxyphenyl ester of 4-hexoxybenzoic acid
4'-propoxyphenyl ester of 4-hexoxybenzoic acid
4'-butoxyphenyl ester of 4-hexoxybenzoic acid, m.p. 64°, t.p. 88°
4'-hexoxyphenyl ester of 4-hexoxybenzoic acid, m.p. 60°, t.p. 86°
4'-heptoxyphenyl ester of 4-hexoxybenzoic acid, m.p. 54°, t.p. 88°
4'-ethylphenyl ester of 4-heptoxybenzoic acid
4'-butyphenyl ester of 4-heptoxybenzoic acid
4'-butoxyphenyl ester of 4-heptoxybenzoic acid
4'-hexoxyphenyl ester of 4-heptoxybenzoic acid
4'-ethylphenyl ester of 4-ethylbenzoic acid
4'-butylphenyl ester of 4-ethylbenzoic acid
4'-hexylphenyl ester of 4-ethylbenzoic acid
4'-ethoxyphenyl ester of 4-ethylbenzoic acid
4'-propoxyphenyl ester of 4-ethylbenzoic acid
4'-butoxyphenyl ester of 4-ethylbenzoic acid
4'-heptoxyphenyl ester of 4-ethylbenzoic acid
4'-ethylphenyl ester of 4-propylbenzoic acid
4'-butylphenyl ester of 4-propylbenzoic acid 4'-hexylphenyl ester of 4-propylbenzoic acid
4'-methoxyphenyl ester of 4-propylbenzoic acid
4'-butoxyphenyl ester of 4-propylbenzoic acid
4'-heptoxyphenyl ester of 4-propylbenzoic acid
4'-methylphenyl ester of 4-butylbenzoic acid
4'-ethylphenyl ester of 4-butylbenzoic acid
4'-butylphenyl ester of 4-butylbenzoic acid, b.p. $_{0.15}$ 191°–193°
4'-pentylphenyl ester of 4-butylbenzoic acid, m.p. 21.5°, t.p. 8.5°
4'-hexylphenyl ester of 4-butylbenzoic acid
4'-heptylphenyl ester of 4-butylbenzoic acid, m.p. 9.3°, t.p. 15°
4'-methoxyphenyl ester of 4-butylbenzoic acid, m.p. 60°, t.p. 25°
4'-ethoxyphenyl ester of 4-butylbenzoic acid
4'-propoxyphenyl ester of 4-butylbenzoic acid
4'-butoxyphenyl ester of 4-butylbenzoic acid, m.p. 43.5°, t.p. 42°
4'-pentoxyphenyl ester of 4-butylbenzoic acid
4'-hexoxyphenyl ester of 4-butylbenzoic acid, m.p. 27°, t.p. 52°
4'-heptoxyphenyl ester of 4-butylbenzoic acid, m.p. 35°, t.p. 42.5°
4'-ethylphenyl ester of 4-pentylbenzoic acid
4'-propylphenyl ester of 4-pentylbenzoic acid
4'-pentylphenyl ester of 4-pentylbenzoic acid
4'-methoxyphenyl ester of 4-pentylbenzoic acid
4'-propoxyphenyl ester of 4-pentylbenzoic acid
4'-heptoxyphenyl ester of 4-pentylbenzoic acid
4'-methylphenyl ester of 4-hexylbenzoic acid
4'-ethylphenyl ester of 4-hexylbenzoic acid
4'-propylphenyl ester of 4-hexylbenzoic acid
4'-butylphenyl ester of 4-hexylbenzoic acid, m.p. 18°
4'-pentylphenyl ester of 4-hexylbenzoic acid
4'-hexylphenyl ester of 4-hexylbenzoic acid
4'-heptylphenyl ester of 4-hexylbenzoic acid, m.p. 31.5°, t.p. 23°
4'-methoxyphenyl ester of 4-hexylbenzoic acid
4'-ethoxyphenyl ester of 4-hexylbenzoic acid
4'-propoxyphenyl ester of 4-hexylbenzoic acid
4'-butoxphenyl ester of 4-hexylbenzoic acid, m.p. 39°, t.p. 49°
4'-pentoxyphenyl ester of 4-hexylbenzoic acid
4'-hexoxyphenyl ester of 4-hexylbenzoic acid, m.p. 43.5°, t.p. 52.5°
4'-heptoxyphenyl ester of 4-hexylbenzoic acid, m.p. 44.5°, t.p. 48.5°
4'-ethylphenyl ester of 4-heptylbenzoic acid
4'-propylphenyl ester of 4-heptylbenzoic acid
4'-hexylphenyl ester of 4-heptylbenzoic acid
4'-butoxyphenyl ester of 4-heptylbenzoic acid
4'-heptoxyphenyl ester of 4-heptylbenzoic acid.

EXAMPLE 2 a. 12.6 g. of potassium-4-butylphenolate and 5.6 g. of sodium bicarbonate are suspended in 400 ml. of diethyl ether at −10°. Under agitation and cooling, a solution of 21 g. of 4-benzyloxycarbonyloxybenzoyl chloride in 150 ml. of diethyl ether is added dropwise to the suspension in such a manner that the temperature does not rise above −10°. After the addition is terminated, the reaction mixture is warmed to +20° and further agitated for 15 minutes at this temperature. Thereafter, the ether solution is filtered, washed with aqueous sodium bicarbonate solution and with water, and dried over sodium sulfate. After distilling off the diethyl ether, the 4'-butylphenyl ester of 4-benzyloxycarbonyloxybenzoic acid remains as a gradually crystallizing oil; after recrystallization from petroleum ether, the product melts at 63°–64°.

Analogously, the following esters of 4-benzyloxycarbonyloxybenzoic acid are produced:

4'-methylphenyl ester
4'-ethylphenyl ester, m.p. 78°–82°
4'-propylphenyl ester, m.p. 60°–62°
4'-pentylphenyl ester
4'-hexylphenyl ester, m.p. 79°
4'-heptylphenyl ester, m.p. 68°.

b. 8.1 g. of the 4'-butylphenyl ester of 4-benzyloxycarbonyloxybenzoic acid is shaken in 150 ml. of toluene in the presence of 3.0 g. of palladium - activated carbon (5%) for 2 hours with hydrogen. Thereafter, the solution is filtered off from the catalyst, evaporated, and the remaining 4'-butylphenyl ester of 4-hydroxybenzoic acid is recrystallized from ligroin; m.p. 134°.

c. 3.3 g. of the 4'-butylphenyl ester of 4-hydroxybenzoic acid is dissolved in 125 ml. of 0.1N ethanolic potassium hydroxide solution, and the latter is evaporated under reduced pressure. The residue is suspended together with 1.1 g. of sodium bicarbonate at −15° in 60 ml. of diethyl ether and mixed dropwise under agitation and cooling with a solution of 1.0 g. of acetyl chloride in 20 ml. of diethyl ether. Thereafter, the mixture is stirred for 30 minutes at 20°; the reaction mixture is then filtered and the ether solution washed with aqueous sodium bicarbonate solution and water, dried over sodium sulfate, and evaporated. The remaining 4'-butylphenyl ester of 4-acetoxybenzoic acid is recrystallized from cold methanol; m.p. 77°, t.p. 19°.

Analogously, the following compounds are obtained:

4'-ethylphenyl ester of 4-acetoxybenzoic acid
4'-propylphenyl ester of 4-acetoxybenzoic acid
4'-pentylphenyl ester of 4-acetoxybenzoic acid
4'-hexylphenyl ester of 4-acetoxybenzoic acid, m.p. 53°, t.p. 37°
4'-heptylphenyl ester of 4-acetoxybenzoic acid, m.p. 53°, t.p. 51°
4'-ethoxyphenyl ester of 4-acetoxybenzoic acid
4'-butoxyphenyl ester of 4-acetoxybenzoic acid, m.p. 82°, t.p. 91°
4'-hexoxyphenyl ester of 4-acetoxybenzoic acid, m.p. 65°, t.p. 86°
4'-heptoxyphenyl ester of 4-acetoxybenzoic acid, m.p. 61°, t.p. 80°
4'-ethylphenyl ester of 4-propionyloxybenzoic acid
4'-propylphenyl ester of 4-propionyloxybenzoic acid
4'-butylphenyl ester of 4-propionyloxybenzoic acid
4'-hexylphenyl ester of 4-propionyloxybenzoic acid
4'-methoxyphenyl ester of 4-propionyloxybenzoic acid
4'-butoxyphenyl ester of 4-propionyloxybenzoic acid
4'-hexoxyphenyl ester of 4-propionyloxybenzoic acid
4'-ethylphenyl ester of 4-butyryloxybenzoic acid
4'-propylphenyl ester of 4-butyryloxybenzoic acid
4'-butylphenyl ester of 4-butyryloxybenzoic acid, m.p. 62°, t.p. 42°
4'-pentylphenyl ester of 4-butyryloxybenzoic acid
4'-hexylphenyl ester of 4-butyryloxybenzoic acid, m.p. 54°, t.p. 50.5°
4'-heptylphenyl ester of 4-butyryloxybenzoic acid, m.p. 47°, t.p. 61°

4'-methoxyphenyl ester of 4-butyryloxybenzoic acid, m.p. 81°, t.p. 86°
4'-ethoxyphenyl ester of 4-butyryloxybenzoic acid
4'-propoxyphenyl ester of 4-butyryloxybenzoic acid
4'-butoxyphenyl ester of 4-butyryloxybenzoic acid, m.p. 85°, t.p. 96°
4'-hexoxyphenyl ester of 4-butyryloxybenzoic acid, m.p. 53°, t.p. 89°
4'-heptoxyphenyl ester of 4-butyryloxybenzoic acid, m.p. 62°, t.p. 42°
4'-ethylphenyl ester of 4-valeryloxybenzoic acid
4'-butylphenyl ester of 4-valeryloxybenzoic acid
4'-hexylphenyl ester of 4-valeryloxybenzoic acid
4'-methoxyphenyl ester of 4-valeryloxybenzoic acid
4'-butoxyphenyl ester of 4-valerloxybenzoic acid
4'-hexoxyphenyl ester of 4-valeryloxybenzoic acid
4'-heptoxyphenyl ester of 4-valeryloxbenzoic acid
4'-methylphenyl ester of 4-caproyloxybenzoic acid
4'-ethylphenyl ester of 4-caproyloxybenzoic acid
4'-propylphenyl ester of 4-caproyloxybenzoic acid
4'-butylphenyl ester of 4-caproyloxybenzoic acid, m.p. 45°, t.p. 47°
4'-pentylphenyl ester of 4-caproyloxybenzoic acid
4'-hexylphenyl ester of 4-caproyloxybenzoic acid, m.p. 38°, t.p. 53°
4'-heptylphenyl ester of 4-caproyloxybenzoic acid, m.p. 42°, t.p. 60.5°
4'-methoxyphenyl ester of 4-caproyloxybenzoic acid
4'-ethoxyphenyl ester of 4-caproyloxybenzoic acid
4'-butoxyphenyl ester of 4-caproyloxybenzoic acid, m.p. 60°, t.p. 90°
4'-hexoxyphenyl ester of 4-caproyloxybenzoic acid, m.p. 53°, t.p. 89°
4'-heptoxyphenyl ester of 4-caproyloxybenzoic acid, m.p. 62°, t.p. 83°
4'-ethylphenyl ester of 4-enanthyloxybenzoic acid
4'-pentylphenyl ester of 4-enanthyloxybenzoic acid
4'-methoxyphenyl ester of 4-enanthyloxybenzoic acid
4'-heptoxyphenyl ester of 4-enanthyloxybenzoic acid
4'-ethylphenyl ester of 4-anisoyloxybenzoic acid, m.p. 136°, t.p. 230°
4'-propylphenyl ester of 4-anisoyloxybenzoic acid, m.p. 110°, t.p. 236°
4'-butylphenyl ester of 4-anisoyloxybenzoic acid, m.p. 106°, t.p. 222°
4'-hexylphenyl ester of 4-anisoyloxybenzoic acid
4'-heptylphenyl ester of 4-anisoyloxybenzoic acid
4'-ethoxyphenyl ester of 4-anisoyloxybenzoic acid
4'-butoxyphenyl ester of 4-anisoyloxybenzoic acid
4'-hexoxyphenyl ester of 4-anisoyloxybenzoic acid, m.p. 112°, t.p. 227°
4'-ethylphenyl ester of 4-(4-ethoxybenzoyloxy)-benzoic acid
4'-butylphenyl ester of 4-(4-ethoxybenzoyloxy)-benzoic acid
4'-hexylphenyl ester of 4-(4-ethoxybenzoyloxy)-benzoic acid
4'-butoxyphenyl ester of 4-(4-ethoxybenzoyloxy)-benzoic acid
4'-hexoxyphenyl ester of 4-(4-ethoxybenzoyloxy)-benzoic acid
4'-methylphenyl ester of 4-(4-propoxybenzoyloxy)-benzoic acid
4'-propylphenyl ester of 4-(4-propoxybenzoyloxy)-benzoic acid
4'-hexylphenyl ester of 4-(4-propoxybenzoyloxy)-benzoic acid
4'-butoxyphenyl ester of 4-(4-propoxybenzoyloxy)-benzoic acid
4'-hexoxyphenyl ester of 4-(4-propoxybenzoyloxy)-benzoic acid
4'-ethylphenyl ester of 4-(4-butoxybenzoyloxy)-benzoic acid
4'-butylphenyl ester of 4-(4-butoxybenzoyloxy)-benzoic acid, m.p. 110°, t.p. 205°
4'-hexylphenyl ester of 4-(4-butoxybenzoyloxy)-benzoic acid
4'-ethoxyphenyl ester of 4-(4-butoxybenzoyloxy)-benzoic acid
4'-butoxyphenyl ester of 4-(4-butoxybenzoyloxy)-benzoic acid
4'-ethylphenyl ester of 4-(4-pentoxybenzoyloxy)-benzoic acid
4'-hexoxyphenyl ester of 4-(4-butoxybenzoyloxy)-benzoic acid
4'-pentylphenyl ester of 4-(4-pentoxybenzoyloxy)-benzoic acid
4'-heptylphenyl ester of 4-(4-pentoxybenzoyloxy)-benzoic acid
4'-methoxyphenyl ester of 4-(4-pentoxybenzoyloxy)-benzoic acid
4'-butoxyphenyl ester of 4-(4-pentoxybenzoyloxy)-benzoic acid
4'-pentoxyphenyl ester of 4-(4-pentoxybenzoyloxy)-benzoic acid
4'-methylphenyl ester of 4-(4-hexoxybenzoyloxy)-benzoic acid
4'-ethylphenyl ester of 4-(4-hexoxybenzoyloxy)-benzoic acid
4'-butylphenyl ester of 4-(4-hexoxybenzoyloxy)-benzoic acid
4'-hexylphenyl ester of 4-(4-hexoxybenzoyloxy)-benzoic acid
4'-heptylphenyl ester of 4-(4-hexoxybenzoyloxy)-benzoic acid
4'-methoxyphenyl ester of 4-(4-hexoxybenzoyloxy)-benzoic acid, m.p. 112°, t.p. 227°
4'-butoxyphenyl ester of 4-(4-hexoxybenzoyloxy)-benzoic acid
4'-hexoxyphenyl ester of 4-(4-hexoxybenzoyloxy)-benzoic acid
4'-methylphenyl ester of 4-toluyloxybenzoic acid
4'-ethylphenyl ester of 4-toluyloxybenzoic acid
4'-butylphenyl ester of 4-toluyloxybenzoic acid
4'-hexylphenyl ester of 4-toluyloxybenzoic acid
4'-methoxyphenyl ester of 4-toluyloxybenzoic acid
4'-butoxyphenyl ester of 4-toluyloxybenzoic acid
4'-heptoxyphenyl ester of 4-toluyloxybenzoic acid 4'-ethylphenyl ester of 4-(4-ethylbenzoyloxy)-benzoic acid, m.p. 91°, t.p. 181°
4'-propylphenyl ester of 4-(4-ethylbenzoyloxy)-benzoic acid
4'-butylphenyl ester of 4-(4-ethylbenzoyloxy)-benzoic acid
4'-hexylphenyl ester of 4-(4-ethylbenzoyloxy)-benzoic acid
4'-methoxyphenyl ester of 4-(4-ethylbenzoyloxy)-benzoic acid, m.p. 133°, t.p. 230°
4'-ethoxyphenyl ester of 4-(4-ethylbenzoyloxy)-benzoic acid
4'-butoxyphenyl ester of 4-(4-ethylbenzoyloxy)-benzoic acid
4'-pentoxyphenyl ester 4-(4-ethylbenzoyloxy)-benzoic acid 4'-hexoxyphenyl ester of 4-(4-ethylbenzoyloxy)-benzoic acid
4'-ethylphenyl ester of 4-(4-propylbenzoyloxy)-benzoic acid
4'-propylphenyl ester of 4-(4-propylbenzoyloxy)-benzoic acid
4'-(butylphenyl ester of 4-(4-propylbenzoyloxy)-benzoic acid
4'-hexylphenyl ester of 4-(4-propylbenzoyloxy)-benzoic acid
4'-heptylphenyl ester of 4-(4-propylbenzoyloxy)-benzoic acid
4'-methoxyphenyl ester of 4-(4-propylbenzoyloxy)-benzoic acid
4'-ethoxyphenyl ester of 4-(4-propylbenzoyloxy)-benzoic acid
4'-propoxyphenyl ester of 4-(4-propylbenzoyloxy)-benzoic acid
4'-hexoxyphenyl ester of 4-(4-propylbenzoyloxy)-benzoic acid
4'-methylphenyl ester of 4-(4-butylbenzoyloxy)-benzoic acid
4'-butylphenyl ester of 4-(4-butylbenzoyloxy)-benzoic acid, m.p. 89°, t.p. 173°
4'-hexylphenyl ester of 4-(4-butylbenzoyloxy)-benzoic acid
4'-methoxyphenyl ester of 4-(4-butylbenzoyloxy)-benzoic acid, m.p. 130°, t.p. 214°
4'-propoxyphenyl ester of 4-(4-butylbenzoyloxy)-benzoic acid
4'-butoxyphenyl ester of 4-(4-butylbenzoyloxy)-benzoic acid
4'-hexoxyphenyl ester of 4-(4-butylbenzoyloxy)-benzoic acid, m.p. 92°, t.p. 187°
4'-ethylphenyl ester of 4-(4-pentylbenzoyloxy)-benzoic acid
4'-pentylphenyl ester of 4-(4-pentylbenzoyloxy)-benzoic acid
4'-heptylphenyl ester of 4-(4-pentylbenzoyloxy)-benzoic acid
4'-methoxyphenyl ester of 4-(4-pentylbenzoyloxy)-benzoic acid
4'-butoxyphenyl ester of 4-(40-pentylbenzoyloxy)-benzoic acid
4'-hexoxyphenyl ester of 4-(4-pentylbenzoyloxy)-benzoic acid
4'-heptoxyphenyl ester of 4-(4-pentylbenzoyloxy)-benzoic acid
4'-ethylphenyl ester of 4-(4-hexylbenzoyloxy)-benzoic acid
4'-butylphenyl ester of 4-(4-hexylbenzoyloxy)-benzoic acid
4'-hexylphenyl ester of 4-(4-hexylbenzoyloxy)-benzoic acid
4'-methoxyphenyl ester of 4-(4-hexylbenzoyloxy)-benzoic acid
4'-ethoxyphenyl ester of 4-(4-hexylbenzoyloxy)-benzoic acid
4'-butoxyphenyl ester of 4-(4-hexylbenzoyloxy)-benzoic acid
4'-hexoxyphenyl ester of 4-(4-hexylbenzoyloxy)-benzoic acid, m.p. 89°, t.p. 177°
4'-heptoxyphenyl ester of 4-(4-hexylbenzoyloxy)-benzoic acid
4'-methylphenyl ester of 4-(4-heptylbenzoyloxy)-benzoic acid
4'-butylphenyl ester of 4-(4-heptylbenzoyloxy)-benzoic acid
4'-ethoxyphenyl ester of 4-(4-heptylbenzoyloxy)-benzoic acid
4'-pentoxyphenyl ester of 4-(4-heptylbenzoyloxy)-benzoic acid
4'-(4-ethylphenoxycarbonyl)-phenyl ester of 4-acetoxybenzoic acid
4'-(4-propylphenoxycarbonyl)-phenyl ester of 4-acetoxybenzoic acid
4'-(4-butylphenoxycarbonyl)-phenyl ester of 4-acetoxybenzoic acid, m.p. 124°, t.p. 218°
4'-(4-hexylphenoxycarbonyl)-phenyl ester of 4-acetoxybenzoic acid
4'-(4-ethoxyphenoxycarbonyl)-phenyl ester of 4-acetoxybenzoic acid
4'-(4-hexoxyphenoxycarbonyl)-phenyl ester of 4-acetoxybenzoic acid
4'-(4-ethylphenoxycarbonyl)-phenyl ester of 4-propionyloxybenzoic acid
4'-(4-propylphenoxycarbonyl)-phenyl ester of 4-propionyloxybenzoic acid
4'-(4-hexylphenoxycarbonyl)-phenyl ester of 4-propionyloxybenzoic acid
4'-(4-methoxyphenoxycarbonyl)-phenyl ester of 4-propionyloxybenzoic acid
4'-propoxyphenoxycarbonyl)-phenyl ester of 4-propionyloxybenzoic acid
4'-(4-heptoxyphenoxycarbonyl)-phenyl ester of 4-propionyloxybenzoic acid
4'-(4-ethylphenoxycarbonyl)-phenyl ester of 4-butyryloxybenzoic acid
4'-(4-butylphenoxycarbonyl)-phenyl ester of 4-butyryloxybenzoic acid, m.p. 110°, t.p. 210°
4'-(4-hexylphenoxycarbonyl)-phenyl ester of 4-butyryloxybenzoic acid
4'-(4-ethoxyphenoxycarbonyl)-phenyl ester of 4-butyryloxybenzoic acid
4'-(4-butoxyphenoxycarbonyl)-phenyl ester of 4-butyryloxybenzoic acid
4'-(4-hexoxyphenoxycarbonyl)-phenyl ester of 4-butyryloxybenzoic acid
4'-(4-ethylphenoxycarbonyl)-phenyl ester of 4-valeryloxybenzoic acid
4'-(4-pentylphenoxycarbonyl)-phenyl ester of 4-valeryloxybenzoic acid
4'-(4-methoxyphenoxycarbonyl)-phenyl ester of 4-valeryloxybenzoic acid
4'-(4-butoxyphenoxycarbonyl)-phenyl ester of 4-valeryloxybenzoic acid
4'-(4-ethylphenoxycarbonyl)-phenyl ester of 4-caproyloxybenzoic acid
4'-(4-butylphenoxycarbonyl)-phenyl ester of 4-caproyloxybenzoic acid, m.p. 98°, t.p. 228°
4'-(4-hexylphenoxycarbonyl)-phenyl ester of 4-caproyloxybenzoic acid
4'-(4-ethoxyphenoxycarbonyl)-phenyl ester of 4-caproyloxybenzoic acid
4'-(4-butoxyphenoxycarbonyl)-phenyl ester of 4-caproyloxybenzoic acid
4'-(4-hexoxyphenoxycarbonyl)-phenyl ester of 4-caproyloxybenzoic acid
4'-(4-heptoxyphenoxycarbonyl)-phenyl ester of 4-caproyloxybenzoic acid
4'-(4-ethylphenoxycarbonyl)-phenyl ester of 4-anisoyloxybenzoic acid
4'-(4-butylphenoxycarbonyl)-phenyl ester of 4-anisoyloxybenzoic acid, m.p. 141°, t.p. >360°
4'-(4-hexylphenoxycarbonyl)-phenyl ester of 4-anisoyloxybenzoic acid 4'-(4-methoxyphenoxycarbonyl)-phenyl ester of 4-anisoyloxybenzoic acid
4'-(4-butoxyphenoxycarbonyl)-phenyl ester of 4-anisoyloxybenzoic acid
4'-(4-hexoxyphenoxycarbonyl)-phenyl ester of 4-anisoyloxybenzoic acid
4'-(4-ethylphenoxycarbonyl)-phenyl ester of 4-(4-ethoxybenzoyloxy)-benzoic acid
4'-(4-butylphenoxycarbonyl)-phenyl ester of 4-(4-ethoxybenzoyloxy)-benzoic acid
4'-(4-hexylphenoxycarbonyl)-phenyl ester of 4-(4-ethoxybenzoyloxy)-benzoic acid
4'-(4-ethoxyphenoxycarbonyl)-phenyl ester of 4-(4-ethoxybenzoyloxy)-benzoic acid
4'-(4-butoxyphenoxycarbonyl)-phenyl ester of 4-(4-ethoxybenzoyloxy)-benzoic acid
4'-(4-hexoxyphenoxycarbonyl)-phenyl ester of 4-(4-ethoxybenzoyloxy)-benzoic acid
4'-(4-propylphenoxycarbonyl)-phenyl ester of 4-(4-propoxybenzoyl-oxy)-benzoic acid
4'-(4-hexylphenoxycarbonyl)-phenyl ester of 4-(4-propoxybenzoyloxy)-benzoic acid
4'-(4-methoxyphenoxycarbonyl)-phenyl ester of 4-(4-propoxybenzoyloxy)-benzoic acid
4'-(4-propoxyphenoxycarbonyl)-phenyl ester of 4-(4-propoxybenzoyloxy)-benzoic acid
4'-(4-hexoxyphenoxycarbonyl)-phenyl ester of 4-(4-propoxybenzoyloxy)-benzoic acid
4'-(4-ethylphenoxycarbonyl)-phenyl ester of 4-(4-butoxybenzoyloxy)-benzoic acid
4'-(4-butylphenoxycarbonyl)-phenyl ester of 4-(4-butoxybenzoyloxy)-benzoic acid
4'-(4-hexylphenoxycarbonyl)-phenyl ester of 4-(4-butoxybenzoyloxy)-benzoic acid
4'-(4-methoxyphenoxycarbonyl)-phenyl ester of 4-(4-butoxybenzoyloxy)-benzoic acid
4'-(4-butoxyphenoxycarbonyl)-phenyl ester of 4-(4-butoxybenzoyloxy)-benzoic acid
4'-(4-hexoxyphenoxycarbonyl)-phenyl ester of 4-(4-butoxybenzoyloxy)-benzoic acid, m.p. 91°, t.p. 215°
4'-(4-heptoxyphenoxycarbonyl)-phenyl ester of 4-(4-butoxybenzoyloxy)-benzoic acid
4'-(4-ethylphenoxycarbonyl)-phenyl ester of 4-(4-pentoxybenzoyloxy)-benzoic acid
4'-(4-pentylphenoxycarbonyl)-phenyl ester of 4-(4-pentoxybenzoyloxy)-benzoic acid
4'-(4-methoxyphenoxycarbonyl)-phenyl ester of 4-(4-pentoxybenzoyloxy)-benzoic acid
4'-(4-propoxyphenoxycarbonyl)-phenyl ester of 4-(4-pentoxybenzoyloxy)-benzoic acid
4'-(4-pentoxyphenoxycarbonyl)-phenyl ester of 4-(4-pentoxybenzoyloxy)-benzoic acid
4'-(4-ethylphenoxycarbonyl)-phenyl ester of 4-(4-hexoxybenzoyloxy)-benzoic acid
4'-(4-butylphenoxycarbonyl)-phenyl ester of 4-(4-hexoxybenzoyloxy)-benzoic acid
4'-(4-hexylphenoxycarbonyl)-phenyl ester of 4-(4-hexoxybenzoyloxy)-benzoic acid
4'-(4-methoxyphenoxycarbonyl)-phenyl ester of 4-(4-hexoxybenzoyloxy)-benzoic acid
4'-(4-ethoxyphenoxycarbonyl)-phenyl ester of 4-(4-hexoxybenzoyloxy)-benzoic acid
4'-(4-butoxyphenoxycarbonyl)-phenyl ester of 4-(4-hexoxybenzoyloxy)-benzoic acid
4'-(4-hexoxyphenoxycarbonyl)-phenyl ester of 4-(4-hexoxybenzoyloxy)-benzoic acid, m.p. 92°, t.p. 202°
4'-(4-heptoxyphenoxycarbonyl)-phenyl ester of 4-(4-hexoxybenzoyloxy)-benzoic acid
4'-(4-ethylphenoxycarbonyl)-phenyl ester of 4-(4-ethylbenzoyloxy)-benzoic acid
4'-(4-butylphenoxycarbonyl)-phenyl ester of 4-(4-ethylbenzoyloxy)-benzoic acid
4'-(4-hexylphenoxycarbonyl)-phenyl ester of 4-(4-ethylbenzoyloxy)-benzoic acid
4'-(4-ethoxyphenoxycarbonyl)-phenyl ester of 4-(4-ethylbenzoyloxy)-benzoic acid
4'-(4-propoxyphenoxycarbonyl)-phenyl ester of 4-(4-ethylbenzoyloxy)-benzoic acid
4'-(4-heptoxyphenoxycarbonyl)-phenyl ester of 4-(4-ethylbenzoyloxy)-benzoic acid
4'-(4-ethylphenoxycarbonyl)-phenyl ester of 4-(4-propylbenzoyloxy)-benzoic acid
4'-(4-propylphenoxycarbonyl)-phenyl ester of 4-(4-propylbenzoyloxy)-benzoic acid
4'-(4-methoxyphenoxycarbonyl)-phenyl ester of 4-(4-propylbenzoyloxy)-benzoic acid
4'-(4-butoxyphenoxycarbonyl)-phenyl ester of 4-(4-propylbenzoyloxy)-benzoic acid
4'-(4-ethylphenoxycarbonyl)-phenyl ester of 4-(4-butylbenzoyloxy)-benzoic acid
4'-(4-butylphenoxycarbonyl)-phenyl ester of 4(4-butylbenzoyloxy)-benzoic acid, m.p. 146°, t.p. 306°
4'-(4-hexylphenoxycarbonyl)-phenyl ester of 4-(4-butylbenzoyloxy)-benzoic acid
4'-(4-methoxyphenoxycarbonyl)-phenyl ester of 4-(4-butylbenzoyloxy)-benzoic acid
4'-(4-butoxyphenoxycarbonyl)-phenyl ester of 4-(4-butylbenzoyloxy)-benzoic acid
4'-(4-heptoxyphenoxycarbonyl)-phenyl ester of 4-(4-butylbenzoyloxy)-benzoic acid
4'-(4-ethylphenoxycarbonyl)-phenyl ester of 4-(4-pentylbenzoyloxy)-benzoic acid
4'-(4-pentylphenoxycarbonyl)-phenyl ester of 4-(4-pentylbenzoyloxy)-benzoic acid
4'-(4-hexylphenoxycarbonyl)-phenyl ester of 4-(4-pentylbenzoyloxy)-benzoic acid
4'-(4-methoxyphenoxycarbonyl)-phenyl ester of 4-(4-pentylbenzoyloxy)-benzoic acid
4'-(4-butoxyphenoxycarbonyl)-phenyl ester of 4-(4-pentylbenzoyloxy)-benzoic acid
4'-(4-hexoxyphenoxycarbonyl)-phenyl ester of 4-(4-pentylbenzoyloxy)-benzoic acid
4'-(4-methylphenoxycarbonyl)-phenyl ester of 4-(4-hexylbenzoyloxy)-benzoic acid
4'-(4-ethylphenoxycarbonyl)-phenyl ester of 4-(4-hexylbenzoyloxy)-benzoic acid
4'-(4-butylphenoxycarbonyl)-phenyl ester of 4-(4-hexylbenzoyloxy)-benzoic acid
4'-(4-hexylphenoxycarbonyl)-phenyl ester of 4-(4-hexylbenzoyloxy)-benzoic acid
4'-(4-methoxyphenoxycarbonyl)-phenyl ester of 4-(4-hexylbenzoyloxy)-benzoic acid
4'-(4-butoxyphenoxycarbonyl)-phenyl ester of 4-(4-hexylbenzoyloxy)-benzoic acid
4'-(4-hexoxyphenoxycarbonyl)-phenyl ester of 4-(4-hexylbenzoyloxy)-benzoic acid The following examples describe mixtures of compounds of Formula I according to this invention and their thermodynamically stable nematic ranges. The mixtures can also be readily subcooled to temperatures below the indicated melting point. The percentage figures are weight percent.

The mixtures set forth in Examples 3–6 do not exhibit the dynamic scattering effect; therefore, they can be utilized as nematic carrier liquids for dyes for the production of colored display units, as well as electrically controllable light shutters.

EXAMPLE 3

70% 4-Butylphenyl ester of anisic acid
30% 4'-Butylphenyl ester of 4-anisoyloxybenzoic acid m.p. 31°; t.p. 73°.

EXAMPLE 4

50% 4'-Butylphenyl ester of 4-(4-butylbenzoyloxy)-benzoic acid
50% 4'-Butylphenyl ester of 4-anisoyloxybenzoic acid m.p. 54.5°; t.p. 204°.

EXAMPLE 5

25% 4'-Butylphenyl ester of 4-(4-butylbenzoyloxy)-benzoic acid
25% 4'-Butylphenyl ester of 4-anisoyloxybenzoic acid
50% 4'-Butylphenyl ester of 4-butylbenzoic acid m.p. −71°; t.p. +61°.

EXAMPLE 6

25% 4'-Butylphenyl ester of 4-(4-butylbenzoyloxy)-benzoic acid
25% 4'-Butylphenyl ester of 4-anisoyloxybenzoic acid
30% 4-Butylphenyl ester of anisic acid
20% 4'-Methoxyphenyl ester of 4-(4-butylbenzoyloxy)-benzoic acid m.p. −50°; t.p. +110°.

The mixtures of this invention described in Examples 7 to 15 exhibit the dynamic scattering effect and are eminently suitable as nematic dielectrics for display systems.

EXAMPLE 7

50% 4'-Hexoxyphenyl ester of 4-hexoxybenzoic acid
50% 4'-Hexoxyphenyl ester of 4-butoxybenzoic acid m.p. 44°; t.p. 85.5°.

EXAMPLE 8

25% 4'-Hexoxyphenyl ester of 4-hexoxybenzoic acid
25% 4'-Hexoxyphenyl ester of 4-butoxybenzoic acid
35% 4-Butylphenyl ester of anisic acid
15% 4'-Methoxyphenyl ester of 4-butylbenzoic acid m.p. −4.5°; t.p. +55.5°.

EXAMPLE 9

25% 4'-Hexoxyphenyl ester of 4-hexoxybenzoic acid
25% 4'-Hexoxyphenyl ester of 4-butoxybenzoic acid
50% 4'-Hexoxyphenyl ester of 4-butyryloxybenzoic acid m.p. 25°; t.p. 83.5°.

EXAMPLE 10

70% 4'-Hexoxyphenyl ester of 4-butylbenzoic acid
30% 4'-Butylphenyl ester of 4-hexoxybenzoic acid m.p. 0°; t.p. 42°.

EXAMPLE 11

70% 4'-Hexoxyphenyl ester of 4-butyryloxybenzoic acid
30% 4'-Methoxyphenyl ester of 4-butyryloxybenzoic acid m.p. 25°; t.p. 82°.

EXAMPLE 12

5% 4'-Hexoxyphenyl ester of 4-hexoxybenzoic acid
5% 4'-Hexoxyphenyl ester of 4-butoxybenzoic acid
10% 4'-Hexoxyphenyl ester of 4-butyryloxybenzoic acid
70% 4'-Methoxyphenyl ester of 4-butyryloxybenzoic acid m.p. 10°; t.p. 82°.

EXAMPLE 13

80% 4'-Hexoxyphenyl ester of 4-butyryloxybenzoic acid
14% 4'-Hexoxyphenyl ester of 4-butylbenzoic acid
6% 4'-Butylphenyl ester of 4-hexoxybenzoic acid m.p. 1.3°; t.p. 50°.

EXAMPLE 14

24% 4'-Methoxyphenyl ester of 4-butyryloxybenzoic acid
56% 4'-Hexoxyphenyl ester of 4-butyryloxybenzoic acid
14% 4'-Hexoxyphenyl ester of 4-butylbenzoic acid
6% 4'-Butylphenyl ester of 4-hexoxybenzoic acid m.p. −13.5°; t.p. 56°.

EXAMPLE 15

7.5% 4'-Methoxyphenyl ester of 4-butyryloxybenzoic acid
9.3% 4'-Hexoxyphenyl ester of 4-butyryloxybenzoic acid
62.4% 4'-Hexoxyphenyl ester of 4-butylbenzoic acid
20.8% 4'-Butylphenyl ester of 4-hexoxybenzoic acid m.p. −22°; t.p. 52°.

What is claimed is:
1. A compound of the formula

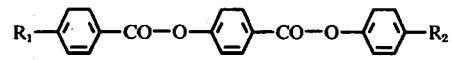

wherein $R_1$ is straight-chain alkyl or straight-chain alkoxy of 1–7 carbon atoms or straight-chain alkanoyloxy of 2–7 carbon atoms, $R_2$ is straight-chain alkyl or straight-chain alkoxy of 1–7 carbon atoms.

2. A compound according to claim 1, wherein $R_1$ and $R_2$ are alkyl of 2–7 carbon atoms.

3. A compound according to claim 1, wherein $R_1$ is alkoxy and $R_2$ is alkyl of 2–7 carbon atoms.

4. A compound according to claim 1, wherein $R_1$ is alkyl of 2–7 carbon atoms and $R_2$ is alkoxy.

5. A compound according to claim 1, wherein $R_1$ is alkanoyloxy and $R_2$ is alkyl of 2–7 carbon atoms.

6. A compound of claim 4 selected from the group consisting of 4'-methoxyphenyl ester of 4-(4-ethylbenzoyloxy)-benzoic acid, 4'-butoxyphenyl ester of 4-(4-ethylbenzoyloxy)-benzoic acid, 4'-methoxyphenyl ester of 4-(4-butylbenzoyloxy)-benzoic acid, 4'-butoxyphenyl ester of 4-(4-butylbenzoyloxy)-benzoic acid and 4'-hexoxyphenyl ester of 4-(4-butylbenzoyloxy)-benzoic acid.

7. A compound of claim 2 selected from the group consisting of 4'-methylphenyl ester of 4-(4-butylbenzoyloxy)-benzoic acid, 4'-butylphenyl ester of 4-(4-butylbenzoyloxy)-benzoic acid, 4'-hexylphenyl ester of 4-(4-butylbenzoyloxy)-benzoic acid, 4'-ethylphenyl ester of 4-(4-hexylbenzoyloxy)-benzoic acid, 4'-butylphenyl ester of 4-(4-hexylbenzoyloxy)-benzoic acid, 4'-hexylphenyl ester of 4-(4-hexylbenzoyloxy)-benzoic acid, 4'-ethylphenyl ester of 4-(4-ethylbenzoyloxy)-benzoic acid and 4'-butylphenyl ester of 4-(4-ethylbenzoyloxy)-benzoic acid.

8. A compound of claim 3 selected from the group consisting of 4'-ethylphenyl ester of 4-anisoyloxybenzoic acid, 4'-propylphenyl ester of 4-anisoyloxybenzoic acid, 4'-heptylphenyl ester of 4-anisoyloxybenzoic acid, 4'-ethylphenyl ester of 4-(4-ethoxybenzoyloxy)-benzoic acid, 4'-butylphenyl ester of 4-(4-butoxybenzoyloxy)-benzoic acid, 4'-methylphenyl ester of 4-(4-hexoxybenzoyloxy)-benzoic acid and 4'-butylphenyl ester of 4-(4-hexoxybenzoyloxy)-benzoic acid.

9. A compound of claim 1 selected from the group consisting of 4'-ethoxyphenyl ester of 4-anisoyloxybenzoic acid, 4'-butoxyphenyl ester of 4-(4-ethoxybenzoyloxy)-benzoic acid, 4'-hexoxyphenyl ester of 4-(4-butoxybenzoyloxy)-benzoic acid, 4'-methoxyphenyl ester of 4-(4-hexoxybenzoyloxy)-benzoic acid and 4'-hexoxyphenyl ester of 4-(4-hexoxybenzoyloxy)-benzoic acid.

10. The compound of claim 1, 4'-butylphenyl ester of 4-anisoyloxybenzoic acid.

11. The compound of claim 1, 4'-butylphenyl ester of 4-(4-butylbenzoyloxy)-benzoic acid.

12. The compound of claim 1, 4'-hexoxyphenyl ester of 4-(4-butylbenzoyloxy)-benzoic acid.

* * * * *